United States Patent
Keefe et al.

(10) Patent No.: US 7,627,453 B2
(45) Date of Patent: Dec. 1, 2009

(54) POWER DISTRIBUTION NETWORK PERFORMANCE DATA PRESENTATION SYSTEM AND METHOD

(75) Inventors: R. Anthony Keefe, Honeoye Falls, NY (US); David Alan Mulder, Cincinnati, OH (US)

(73) Assignee: Current Communications Services, LLC, Rochester, NY (US)

(*) Notice: Subject to any disclaimer, the term of this patent is extended or adjusted under 35 U.S.C. 154(b) by 508 days.

(21) Appl. No.: 11/114,024

(22) Filed: Apr. 26, 2005

(65) Prior Publication Data

US 2006/0238364 A1 Oct. 26, 2006

(51) Int. Cl.
*G06F 11/30* (2006.01)
*G06F 11/32* (2006.01)

(52) U.S. Cl. .................... 702/182; 345/589

(58) Field of Classification Search .......... 702/57–62, 702/64, 182–183, 185; 700/288–298; 345/589; 703/5
See application file for complete search history.

(56) References Cited

U.S. PATENT DOCUMENTS

| | | | |
|---|---|---|---|
| 1,790,024 A | 1/1931 | Rump | |
| 3,445,814 A | 5/1969 | Spalti | |
| 3,656,112 A | 4/1972 | Paull | |
| 3,900,842 A * | 8/1975 | Calabro et al. | 340/870.02 |
| 3,942,168 A | 3/1976 | Whyte | |
| 3,967,264 A | 6/1976 | Whyte et al. | |
| 3,973,087 A * | 8/1976 | Fong | 375/211 |
| 3,973,240 A | 8/1976 | Fong | |
| 4,119,948 A | 10/1978 | Ward | |
| 4,442,492 A | 4/1984 | Karlsson et al. | |
| 4,652,855 A | 3/1987 | Weikel | |
| 4,654,806 A | 3/1987 | Poyser et al. | |
| 4,878,142 A * | 10/1989 | Bergman et al. | 361/80 |
| 5,056,107 A | 10/1991 | Johnson et al. | |
| 5,426,360 A | 6/1995 | Maraio et al. | |
| 5,448,229 A | 9/1995 | Lee, Jr. | |
| 5,568,399 A * | 10/1996 | Sumic | 700/293 |
| 5,625,751 A * | 4/1997 | Brandwajn et al. | 706/20 |

(Continued)

FOREIGN PATENT DOCUMENTS

EP 0 581 351 A1 2/1994

OTHER PUBLICATIONS

"Archnet: Automatic Meter Reading System Power Line Carrier Communication", www.archnetco.com/english/product/product_sl.htm, (2001),.

(Continued)

*Primary Examiner*—Eliseo Ramos Feliciano
*Assistant Examiner*—Mary C Baran
(74) *Attorney, Agent, or Firm*—Mel Barnes; Capital Legal Group, LLC

(57) ABSTRACT

A visualization system for monitoring performance data of an electrical power distribution network is provided. In one embodiment, a user may select a network circuit and view a network circuit diagram that includes indicia representing transformers and other electrical power distribution network elements positioned on a map. The relative positions of the indicia on the network circuit diagram may correspond to the relative physical locations of the transformers in the geographical area represented by the map. The indicia may be color coded to convey performance data to the user.

33 Claims, 6 Drawing Sheets

U.S. PATENT DOCUMENTS

| | | | |
|---|---|---|---|
| 5,696,501 A * | 12/1997 | Ouellette et al. | 340/870.02 |
| 5,748,104 A | 5/1998 | Argyroudis et al. | |
| 5,801,643 A | 9/1998 | Williams et al. | |
| 5,805,458 A | 9/1998 | McNamara et al. | |
| 5,880,677 A | 3/1999 | Lestician | |
| 5,892,758 A | 4/1999 | Argyroudis | |
| 6,150,955 A | 11/2000 | Tracy et al. | |
| 6,151,330 A | 11/2000 | Liberman | |
| 6,239,722 B1 | 5/2001 | Colton et al. | |
| 6,255,805 B1 | 7/2001 | Papalia et al. | |
| 6,259,972 B1 * | 7/2001 | Sumic et al. | 700/286 |
| 6,262,672 B1 | 7/2001 | Brooksby et al. | |
| 6,346,875 B1 | 2/2002 | Puckette et al. | |
| 6,373,399 B1 | 4/2002 | Johnson et al. | |
| 6,459,998 B1 | 10/2002 | Hoffman | |
| 6,504,357 B1 | 1/2003 | Hemminger et al. | |
| 6,538,577 B1 | 3/2003 | Ehrke et al. | |
| 6,611,134 B2 | 8/2003 | Chung | |
| 6,618,709 B1 | 9/2003 | Sneeringer | |
| 6,650,249 B2 | 11/2003 | Meyer et al. | |
| 6,684,245 B1 | 1/2004 | Shuey et al. | |
| 6,710,721 B1 | 3/2004 | Holowick | |
| 6,711,512 B2 | 3/2004 | Noh | |
| 6,737,984 B1 | 5/2004 | Welles et al. | |
| 6,778,099 B1 | 8/2004 | Meyer et al. | |
| 6,954,814 B1 | 10/2005 | Leach | |
| 6,965,303 B2 | 11/2005 | Mollenkopf | |
| 6,980,091 B2 | 12/2005 | White et al. | |
| 6,986,071 B2 * | 1/2006 | Darshan et al. | 713/330 |
| 6,998,962 B2 | 2/2006 | Cope et al. | |
| 7,089,089 B2 * | 8/2006 | Cumming et al. | 700/295 |
| 7,089,125 B2 | 8/2006 | Sonderegger | |
| 2001/0010032 A1 | 7/2001 | Ehlers et al. | |
| 2001/0038343 A1 | 11/2001 | Meyer et al. | |
| 2002/0084914 A1 | 7/2002 | Jackson et al. | |
| 2002/0147809 A1 * | 10/2002 | Vinberg | 709/224 |
| 2002/0161558 A1 | 10/2002 | Georges et al. | |
| 2003/0149581 A1 * | 8/2003 | Chaudhri et al. | 705/1 |
| 2004/0036478 A1 * | 2/2004 | Logvinov et al. | 324/534 |
| 2004/0064276 A1 | 4/2004 | Villicana et al. | |
| 2004/0090312 A1 * | 5/2004 | Manis et al. | 340/310.02 |
| 2004/0239522 A1 | 12/2004 | Gallagher | |
| 2004/0243377 A1 * | 12/2004 | Roytelman | 703/18 |
| 2005/0090995 A1 | 4/2005 | Sonderegger | |
| 2005/0096772 A1 | 5/2005 | Cox et al. | |
| 2005/0223782 A1 | 10/2005 | Dohi et al. | |
| 2006/0007016 A1 | 1/2006 | Borkowski et al. | |
| 2006/0031180 A1 | 2/2006 | Tamarkin et al. | |
| 2006/0033454 A1 | 2/2006 | Mathews et al. | |
| 2006/0045105 A1 | 3/2006 | Dobosz et al. | |
| 2006/0091877 A1 | 5/2006 | Robinson et al. | |
| 2006/0106554 A1 | 5/2006 | Borkowski et al. | |
| 2006/0145834 A1 | 7/2006 | Berkman et al. | |
| 2006/0201264 A1 | 9/2006 | Dohi et al. | |

OTHER PUBLICATIONS

"EMETCON Automated Distribution System", *ABB Power T & D Company, Inc*, (Jan. 1990),1-14.

"Outlook Conference 2004: Amperion Deployment Overview", *Primen Conference*, (May 7, 2004),1-10.

Lokken, G , et al., "The Proposed Wisconsin Eectric Power Company Load Management System Using Power Line Carrier Over Distribution Lines", *1976 National Telecommunications Conference, IEEE*, (1976),2.2-12.2-3.

Russell, B D., "Communication Alternatives for Distribution Metering and Load Management", *IEEE Transactions on Power Apparatus and Systems*,(1980),1448-1455.

\* cited by examiner

POWER DISTRIBUTION NETWORK PERFORMANCE DATA PRESENTATION SYSTEM AND METHOD

FIELD OF THE INVENTION

The present invention generally relates to a presentation system for an electric power distribution network (EPDN) and more particularly, to a visualization system for monitoring the performance of a EPDN and a method of using the same.

BACKGROUND OF THE INVENTION

Well-established power distribution systems exist throughout most of the United States, and other countries, which provide power to customers via power lines. A power line communications system (PLCSs) may use the infrastructure of the existing power distribution systems to provide broadband data communications in addition to power delivery.

In addition to communicating user data, such PLCSs may be used to monitor the EPDN. Some such systems may collect performance data (which may include configuration data) of the EPDN, which may include collecting voltage measurements, current measurements, and configuration measurements such as data indicating whether a switch, cut-out, or recloser is open or closed, whether a capacitor bank is engaged or not, and other such performance data.

Even though a PLCS may be installed on the EPDN, electric utility companies generally do not have the ability to efficiently and easily remotely monitor their power distribution networks. Consequently, there is a need for a system and method to process the data collected by a PLCS and to present performance information to the operator of an EPDN in an efficient, economical, and useful manner. Additionally, it would be desirable to provide a system that provides flexible presentation of the data to the operator, that provides high level and detailed level presentations of the information, that receives a request for and responds with additional information for the operator, and that allows the operator to quickly and easily identify problems and the operational condition of the network. These and other advantages may be provided by various embodiments of the present invention.

SUMMARY OF THE INVENTION

The present invention provides a visualization system for monitoring performance data of an electrical power distribution network. In one embodiment, a user may select a network and view a network circuit diagram that includes indicia representing transformers positioned on a map. The relative positions of the indicia on the network circuit diagram may correspond to the relative physical locations of the transformers in the geographical area represented by the map. The indicia may be color coded to convey performance data to the user.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, power line communications systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, power line communications systems, components, techniques, data and network protocols, software products and systems, operating systems, development interfaces, and hardware are omitted so as not to obscure the description of the present invention.

System Architecture and General Design Concepts

Figure 1:
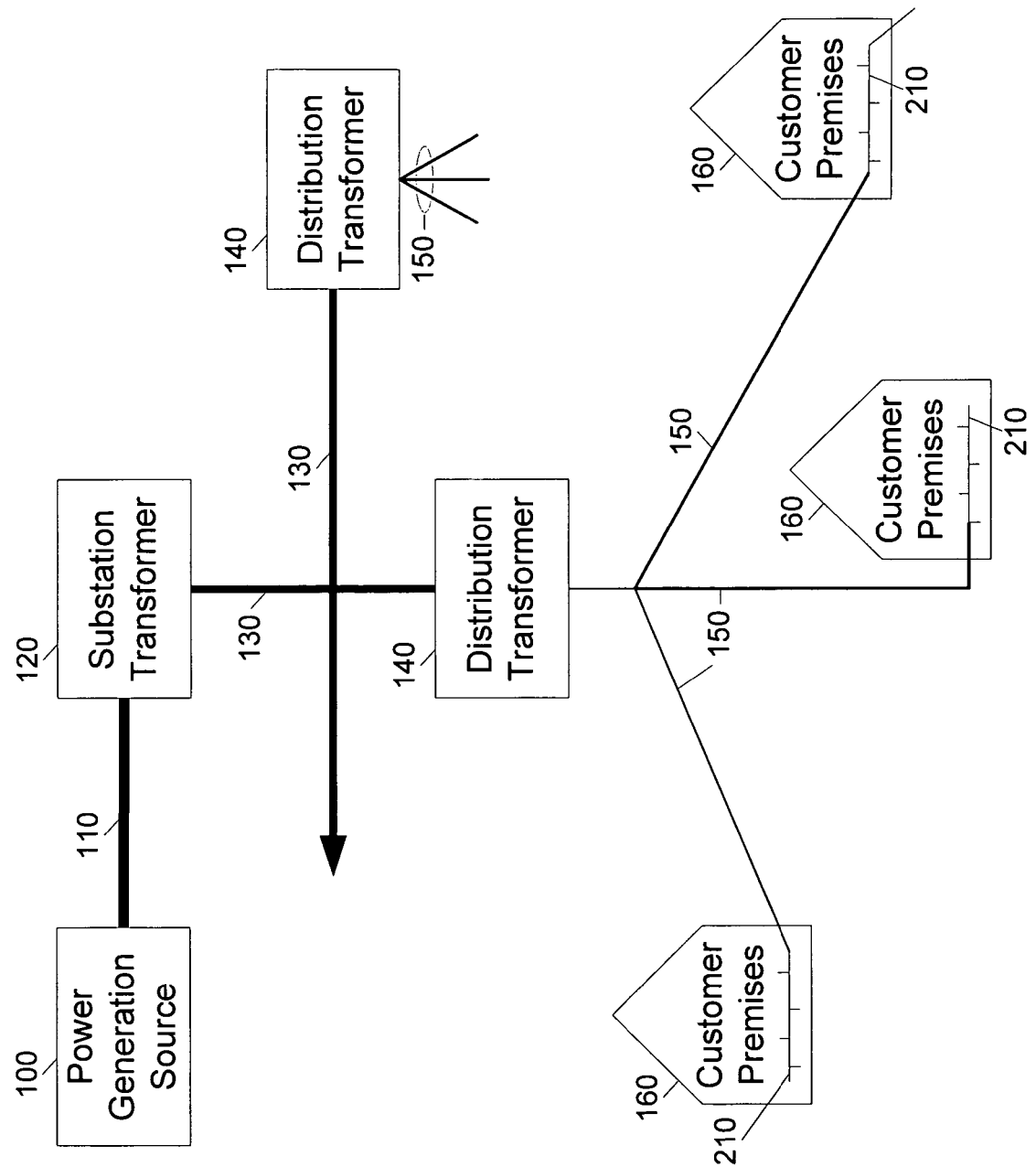
FIG. 1 is a diagram of an exemplary power distribution system with which the present invention may be employed.

FIG. 1 illustrates an example power distribution systems that includes components for power generation 100, power transmission 110, and power delivery 130, 150. A power generation source 100 generates a voltage and a transmission substation increases this voltage to high voltage (HV) levels for long distance transmission on HV transmission lines 110 to a substation transformer 120. Typical voltages found on HV transmission lines 110 range from 69 kilovolts (kV) to in excess of 800 kV.

In addition to HV transmission lines 110, power distribution systems include medium voltage (MV) power lines 130 and low voltage (LV) power lines 150. MV typically ranges from about 1000 V to about 100 kV, and LV typically ranges from about 100 V to about 480 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from a substation transformer 120 to a distribution transformer 140 over one or more MV power lines 130. Power is carried from the distribution transformer 140 to the customer premises via one or more LV power lines 150.

In addition, a distribution transformer 140 may function to distribute one, two, three, or more phase power signals to the customer premises 160, depending upon the demands of the user. In the United States, for example, these local distribution transformers typically feed anywhere from one to ten homes, depending upon the concentration of the customer premises in a particular area. Distribution transformers 140 may be pole-top transformers located on a utility pole, pad-mounted transformers located on the ground, or transformers located under ground level.

Power Line Communication System

The following brief description provides one example PLCS with which the present invention may be used. Other types of PLCS may be used with the present invention as well.

Figure 2:
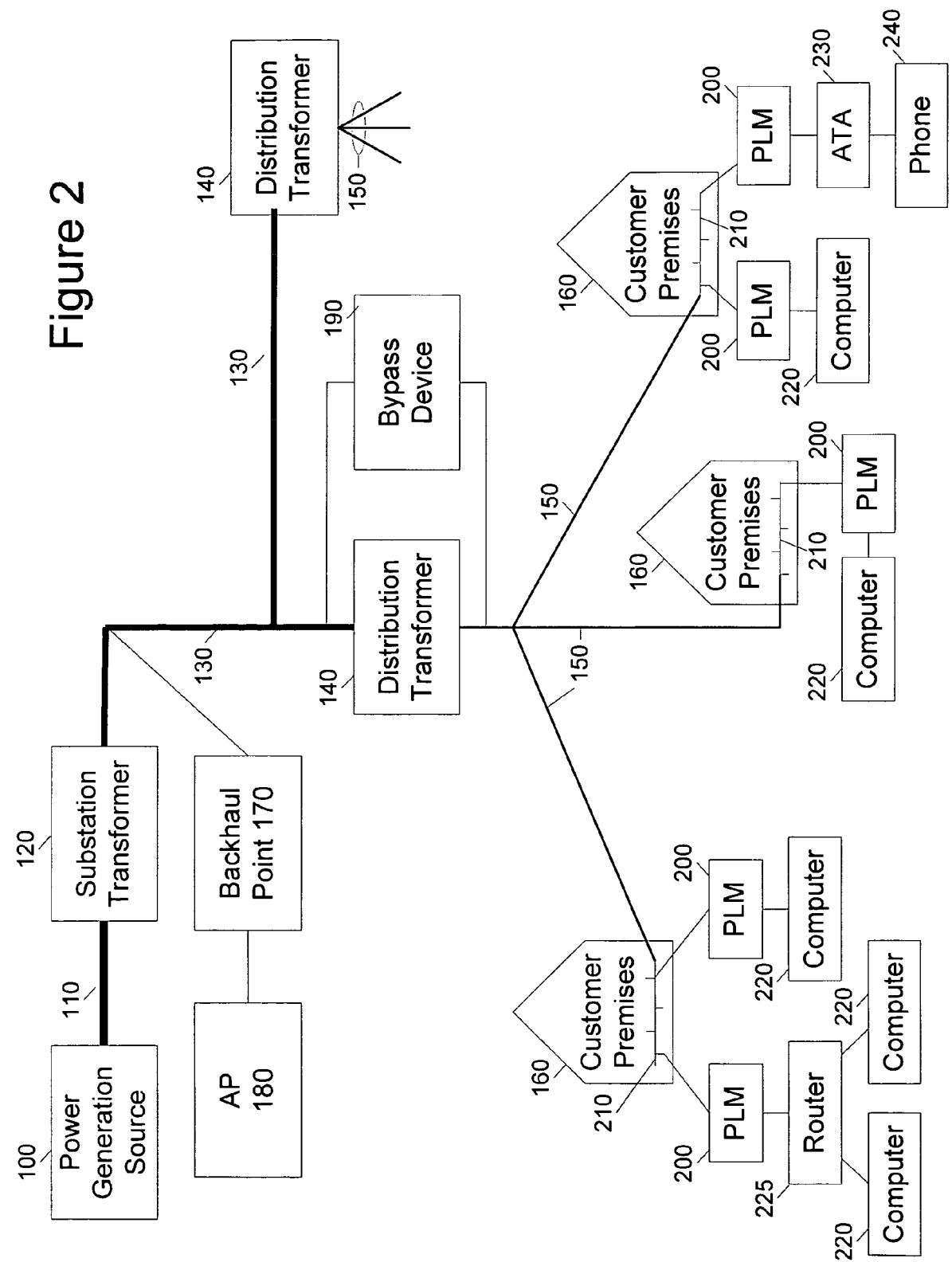
FIG. 2 is a diagram of a portion of an example power line communications system with which an example embodiment of the present invention may be used.

An example PLCS is shown in FIG. 2 that includes one or more network elements (NE) or communications devices, which may include transformer bypass devices (BD) 190 and backhaul points (BP) 170. A PLCS subnet may be defined as the part of a PLCS served by a single backhaul point 170.

In this illustration, only one bypass device 190 is depicted. However, in practice five, ten, or more bypass devices 190 may form part of a single PLCS subnet. The bypass device 190 is the gateway between the LV power line subnet (i.e., the LV power lines 150 and the devices that are communicatively coupled to the LV power lines 150) and the MV power line 130. The bypass device 190 may provide communications services for user computers 220 or other devices at customer premises 160, which services may include security management, routing of Internet protocol (IP) packets, filtering data, access control, service level monitoring, signal processing and modulation/demodulation of signals transmitted over the power lines.

In this example PLCS, the PLCS subnet also includes a backhaul point 170. The backhaul point 170 is an interface and gateway between the MV power line 130 and a non-power line telecommunications network. One or more backhaul points 170 typically are communicatively coupled to an aggregation point (AP) 180, which may be co-located to a point of presence (POP) to the Internet. Alternately, the AP 180 may be connected to the POP and/or Internet remotely and in any suitable manner. The backhaul point 170 may be connected to the AP 180 using any available mechanism, including fiber optic conductors, T-carrier, Synchronous Optical Network (SONET), or wireless techniques. Thus, the backhaul point 170 includes a transceiver suited for communicating through the non-power line telecommunications medium (hereinafter the "backhaul link"). The backhaul point 170 is also coupled to the MV power line 130 to transmit and receive communication signals on the MV power line 130.

Another type of NE that may be found in the PLCS but not shown in FIG. 2, are LV and MV repeaters. These devices are found on power lines and receive and repeat the communication signals found on the power lines to extend the range of communications.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote network operations center (NOC), and/or at a PLCS Point of Presence (POP), to oversee a group of communication devices via the Internet. The PLS may provide an Internet identity to the network devices by assigning the devices (e.g., user devices, BDs 100, (e.g., the LV modems and MV modems of BDs), BPs 170, and AP 180) IP addresses and storing the IP addresses and other device identifying information (e.g., the device's location, address, serial number, etc.) in its memory. In addition, the PLS may approve or deny user devices authorization requests, command status reports, statistics and measurements from the BDs, and BPs, and provide application software upgrades to the communication devices (e.g., BDs, BPs, and other devices). The PLS collects and stores electric power distribution information. The system uses that data to interface with utilities' back-end computer systems and may provide enhanced power distribution services such as automated meter reading, outage detection, restoration detection, load balancing, distribution automation, Volt/Volt-Amp Reactance (Volt/VAr) management, and other similar functions. The PLS also may be connected to one or more APs and/or core routers directly or through the Internet and therefore can communicate with any of the BDs, user devices, and BPs through the respective AP and/or core router.

The PLS and its network elements (BPs and BDs) may communicate with each other through two types of communications: 1) PLS Commands and responses therefrom, and 2) BD Alerts and Alarms. TCP packets are used to communicate commands and responses in the current embodiment. The commands typically are initiated by the NE portion of the PLS. Responses sent by the BD 190 (hereinafter to include repeating BDs 190) may be in the form of an acknowledgement (ACK) or negative acknowledgement (NACK), or a data response depending on the type of command received by the BD 190.

Commands

These commands may include altering configuration information, synchronizing the time of the network element with that of the PLS, controlling measurement intervals (e.g., MV and/or LV voltage measurements), scheduling measurements, requesting transmission of measurement or data statistics, requesting the status of user device activations, and requesting reset or other system-level commands. Any or all of these commands may require a unique response from the network element, which is transmitted by the device and received and stored by the PLS.

A power line modem (PLM) may be connected to or integrated into a smart utility meter such as a gas meter, electric meter, or water meter. The meter, at the command of the system, may be assigned an IP address by the PLCS (e.g., by the PLS) and, upon receiving a request or at predetermined intervals, transmit data such as consumption data to the BD 100, the system, and/or a utility computer system in a manner described herein, thereby eliminating the need to have utility personnel physically travel to read the meter. In addition, one or more addressable switches, which may form part of a utility meter, may be controlled via the PLCS (e.g., with commands transmitted from the BD 100, the PLS, the system, and/or utility computer system) to permit connection and disconnection of gas, electricity, and/or water to the customer premises.

Similarly, the PLCS may be used to monitor and control reclosers, MV power line switches, direct load control devices, and other such devices. The addressable MV power line switch may be a motorized switch and assigned an IP address by the PLS, which is also provided to the utility computer system to thereby operate the switch. When a power outage is detected, the utility company may remotely operate one or more addressable MV power line switches to provide power to the area where the outage is detected by transmitting commands to the IP addresses of the switches.

Likewise, the PLCS may be used to monitor and operate a capacitor bank switch that inserts or removes a capacitor (or capacitor bank) into the power distribution system. Capacitor banks are used to improve the efficiency of the power distribution network by providing Volt/VAr management (e.g., modifying the reactance of the power distribution network). Thus, the PLS may assign an IP address to one or more capacitor bank switches, which is also provided to the utility computer system to thereby operate the switch. Based on power quality measurements taken and received from one or more BDs 100, the utility company may insert or remove one or more capacitor banks by remotely actuating one or more capacitor bank switches by transmitting commands to the IP addresses of the switches.

The capacitor switch and the MV power line switch may be controlled by an embodiment of the present invention that includes an MV interface and controller. In addition, in some embodiments an LV interface may also be employed.

The BD 100 typically transmits the data to (and receives the data from) the backhaul point 10, which, in turn, transmits the data to (and receives the data from) the AP 20. The AP 20 then transmits the data to (and receives the data from) the appropriate destination (perhaps via a core router), which may be a network destination (such as an Internet address) in which case the packets are transmitted to, and pass through, numerous routers (herein routers are meant to include both network routers and switches) in order to arrive at the desired destination.

A detailed description of an example PLCS, its components and features is provided in U.S. patent application Ser. No. 10/641,689 filed Aug. 14, 2003, entitled "Power Line Communication System and Method of Operating the Same," which is hereby incorporated by reference in its entirety. A detailed description of another example PLCS, its components and features is provided in U.S. patent application Ser. No. 10/973,493 filed Oct. 26, 2004, entitled "Power Line Communications System and Method of Operating the Same," which is hereby incorporated by reference in its entirety. The present invention may be used with networks as described in the above patent applications or others. Thus, the invention is not limited to a particular PLCS, PLCS architecture, or topology.

The present invention may receive data in any suitable manner such as via a PLCS. Specifically, the data presented by the system to the user may be data collected via a PLCS including, but not limited to, the PLCS described above. The system may retrieve the data, process the data, format the data, and display the data. In some instances, the data need not be processed or formatted but is simply displayed as raw data.

In the above example, voltage measurements of both the first and second LV energized conductors may be taken by the network element (e.g., a BD 190 or repeater) that is installed at the transformer (e.g., on the same pole in the case of overhead distribution networks or at or near the transformer enclosure for underground residential distribution systems). In other embodiments, data may be provided from electronic power usage meters that may be installed at or near the customer premises. Such data may be transmitted from the meter via the PLCS to the PLS, the system, or other system for storage in a database to be accessed via the system. Thus, in either case, the data may be communicated to a computer for storage in a database, at least in part, via a PLCS which may include transmission over the power lines (e.g., MV and/or LV power lines), wireless transmissions (e.g., via an IEEE 802.11 protocol, IEEE 802.16 (WiMAX) protocol, etc.), a combination thereof, and/or any other suitable communications means (e.g., wireless collection via a roaming collection vehicle). Thus, the data used by the present invention may be collected via any mechanism suitable for the collection of the necessary data.

The present invention provides a visualization system for monitoring performance data of an electrical power distribution network. The performance data may data relating to current measurements, voltage measurements, power quality management measurements, noise measurements, temperature measurements (e.g., transformer temperature), power usage data, and configuration data (e.g., whether a recloser, switch, direct load control device, capacitor bank or other element is open or closed and other such status information). The system may include a computer system and either have access to, or include a memory storing, a database of electrical power distribution network data and associated performance data. In one example embodiment, the computer system may be a conventional Windows® based computer system and include a central processing unit (CPU), a video display monitor, a keyboard, a mouse, a microphone, and an audio output device. The system is controlled via a software program that is stored in memory and/or on a compact disk or other tangible medium and that is executed by the computer system's CPU. The software program is executable to cause the computer system to display one or more screens on the video display monitor that include diagrams and/or data of EPDN performance data. The screens may be displayed in a hyper text markup language (HTML) browser such as Internet Explorer® or via any other suitable display method. Thus, communications with the system may be via hypertext transfer protocol (HTTP).

The database may be stored locally (in the computer system used by the user) or may be external and, therefore, may be nearby (i.e., in the same building or room) or may be remote in which case it may be accessed via the Internet or other suitable communications channel. As is known to those skilled in the art, the EPDN may include various elements such as transformers, substations, power meters, cut-outs, reclosers, arrestors, switch banks, direct load control devices, capacitor banks, and others (collectively referred to herein as "EPDN Elements"). Thus, for some or of the EPDN elements, the database may store information such as the transformer identification (ID), substation ID, cut-out ID, power meter ID, direct load control device ID, recloser ID, arrestor ID, switch bank ID, and capacitor bank ID. For each EPDN element, the database also may include the physical structure to which the element is mounted or otherwise associated. For each structure, the database also may store a location such as a longitude and latitude. For example, a transformer may be mounted to different structures which may include a utility pole, a ground level pad, or underground pad. Thus, the database may store structure information including a structure ID (e.g., pole number or pad number) for those elements, such as transformers, associated with a structure. For each distribution transformer the database may store the premise IDs, customer names, and service addresses served by that distribution transformer.

The user may access the system locally or remotely via a dial up, via the Internet, via a wireless link, or in any other fashion such as, for example, via a virtual private network (VPN) connection over the Internet. In a remote access scenario, the video display monitor and user input devices may be remote from the remainder of the computer system. Likewise, the software program controlling execution of the invention may be remote from the user or distributed (e.g., a portion executing on the user's local computer and a portion executing on the remote system computer).

Upon access by the user, the user may be required to log in by providing a username and password before being permitted to access the EPDN information. After logging in, the user may request a search and supply an input, which may include a transformer ID, Circuit information, or a pole ID. In response to the search request and user inputs the system may search the data base for the record(s) associated with the transformer ID, Circuit information, or pole ID supplied by the user and display the retrieved information. Specifically, if the user provides a transformer ID or pole ID, the system may display an Element Screen, which is described in more detail below. If the user supplies circuit information, the system may display a Network Circuit Screen as described below. A network circuit is meant to include at least a portion of a medium voltage power line and at least one LV power line subnet, but typically may include a plurality of LV subnets.

Alternately, the user may supply customer information, such as the customer name, customer ID, service address, or premise code. In response to the search request and user inputs the system will search the database for the record associated with the supplied customer information and display the retrieved information on the video monitor, which may include voltage measurements and power usage information of the customer (or customer premises) over a predetermined or user selected period of time.

The user may elect to view a list of some or all of the network circuits and may then select (by clicking on the link) to display the Network Circuit Screen of any network circuit in the list. In response to the user input, the system may retrieve the information associated with the selected network circuit and use the retrieved information to generate and display the Network Circuit Screen of the network circuit.

Figure 3:
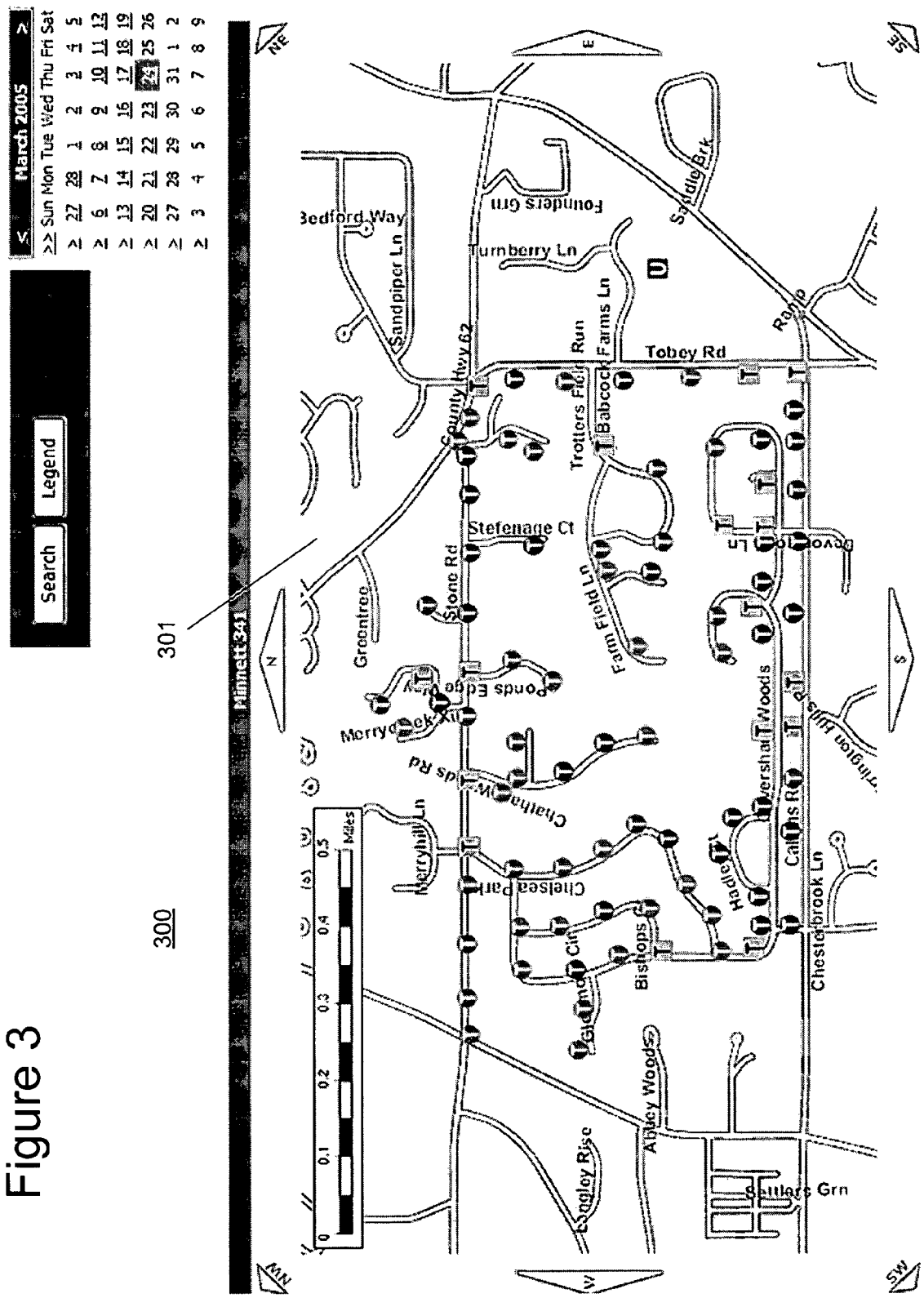
FIG. 3 is an illustration of an example Network Circuit Screen according to an example embodiment of the present invention.

FIG. 3 illustrates an example Network Circuit Screen 300 according to one embodiment of the present invention. As shown in FIG. 3, the Network Circuit Screen 300 may include a network circuit diagram 301 comprising a map that includes streets, roads, highways, and other such manmade or natural pathways (collectively hereinafter referred to as "thoroughfares"). The network circuit diagram 301 may also include a plurality of indicia representing distribution transformers. In this embodiment, the indicia representing transformers is a white "T" superimposed on a colored circle. The relative positions of the transformer indicia in the network circuit diagram 301 substantially correspond to the positions of the transformers in the network circuit. Likewise, the relative positions of the transformer indicia on the map in the network circuit diagram 301 substantially correspond to the positions of the transformers relative to the thoroughfares and other geography represented on the map. Because the map of this example embodiment may include the thoroughfare names, the locations of the transformers may be located even without other information (e.g., longitude and latitude information). Other embodiments of the network diagram circuit 301, however, may not include a map with street names or any map at all. Along the edges of this example embodiment of the network circuit diagram 301 are a plurality of selectable arrows that, upon the selection by the user, will cause the system to redisplay a new portion of the map and network circuit located in the direction of the selected arrow. In addition, the user may provide an input that causes the system to display a larger (zoom out) or smaller (zoom in) portion of the network circuit and map.

The plurality of transformer indicia also may be coded (e.g., color or shape coded) to indicate a selected performance value(s) for each of the plurality of distribution transformers based on the most recently collected data. In this example embodiment, the selected performance value is the voltage measured on the two low voltage energized conductors. In this embodiment, if the voltage on either low voltage energized conductor is below a first threshold voltage, the circle on which the white "T" is superimposed may be color coded blue. If the voltage on either low voltage energized conductor is above a second threshold voltage, the indicia may be color coded red. If the voltage on both low voltage energized conductors is within normal operating parameters (e.g., equal to or above the first threshold voltage and equal to or below the second threshold voltage), the indicia may be color coded green. If the system is not able to determine the selected performance parameter value (e.g., because no data exists in the database), the indicia may be coded as a gray square. Other embodiments or screens may include indicia representing other EPDN elements and that are coded to represent performance information as well. Thus, by viewing the network circuit diagram 301 the user can quickly determine the EPDN elements that satisfy a predetermined condition (e.g., within a voltage range, current range, switch open, etc.) for a performance parameter. In this example, the user may view the network circuit diagram 301 to identify those transformers that are working within normal voltage range, those that are not, and those for which there is no data.

The above example provides performance information to the user that represents the most recently collected data, which may be real-time. The network circuit diagram 301, and associated performance information, also may be displayed for any time period as selected by the user. For example, the user may request and be presented performance information for the current day, the previous day, the previous month, any month, any year, or any other time period. In response, the system will access the database and compare the voltage measurements of the low voltage energized conductors for that time period to the threshold voltages. The system may then display the selected performance data for that time period. For example, if the user selects the month of January, the system may access the voltage data for the transformers in the network circuit diagram and compare the voltage measurement data of January to the two threshold voltages and display the color coded indicia to indicate if, at any time during the month of January, either low voltage energized conductor was above or below the first and/or second thresholds, respectively, or whether the both conductors were within normal operating. The color coded indicia may be presented as described above. Additionally, if the voltages of either low voltage power line conductors were both below the first threshold and above the second threshold during the time period, the indicia may be color coded purple.

The network circuit diagram 301 may also include indicia representing substations ("U"), cut-outs ("C"), reclosers ("R"), arrestors ("L"), switch banks ("W"), switch bank/arrestor combination ("S"), power meters ("M"), direct load control devices ("D"), and capacitor banks ("P"). Again, each of these indicia may coded (e.g., shape and/or color coded) to provide performance data about the EPDN element. For example, the indicia for each recloser ("R") may be color coded red when the recloser is open and color coded blue when the recloser is closed. Similarly, the indicia for each switch bank ("W") and switch bank/arrestor combination ("S") may be color coded red when the switch bank is open and color coded blue when the switch bank is closed. Likewise the indicia for each capacitor bank ("P") may be color coded red when the capacitor is engaged and color coded blue when the capacitor bank is not engaged. The Network Circuit Screen 300, and many of the other screens herein, may include a calendar. The user may select any day, week, month, year, or other time period for which to request information by clicking on portions of the calendar. In response, the system may re-display the existing screen with new data for the selected time or time period.

Figure 4:
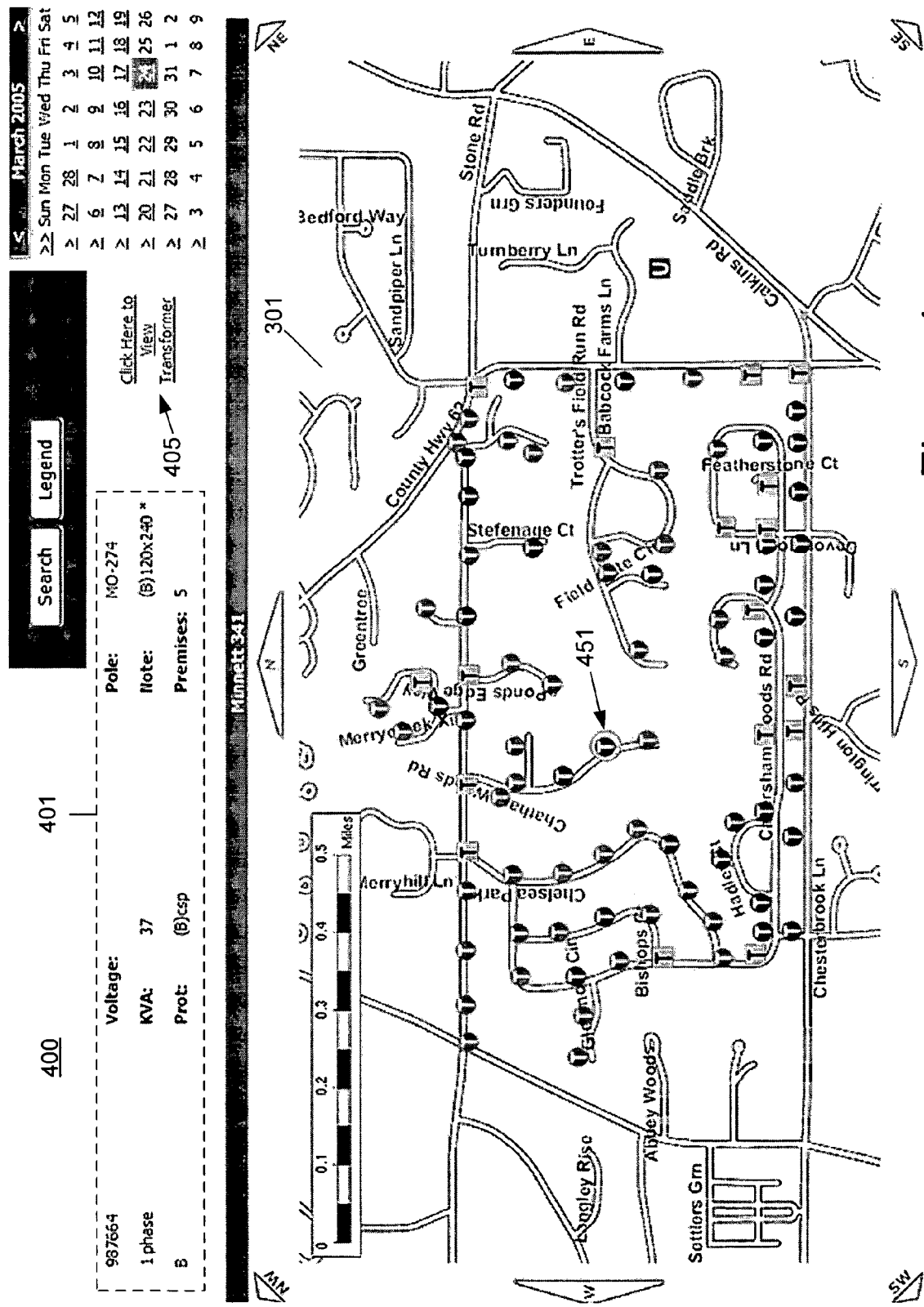
FIG. 4 is an illustration of an Element Screen according to an example embodiment of the present invention.

While viewing the network circuit diagram 301, the user may select any EPDN element by clicking on the indicia representing the element displayed in the network circuit diagram 301. In response, the system may retrieve and display additional information about the selected element on an Element Screen 400. An example transformer Element Screen 400 is shown in FIG. 4. The transformer Element Screen 400 may include a header 401 that provides the transformer ID, and product information of the selected transformer such as the transformers rating (50 KVA) and the type of transformer (e.g., single phase). In addition, the header 401 may disclose information relating to the structure to which the selected transformer is mounted (e.g., Pole: MO-129), the number of premises served (e.g., 5), and the MV phase to which the transformer is connected (e.g., A, B, or C). The header 401 may also include any comments or memos (under the heading Note) and the type of insulation (under "Prot:"). In addition, the Element Screen 400 may include the network circuit diagram with the selected indicia hi-lighted such as, for example, a circle 451 around the selected indicia. The Element Screen 400 may also include a link 405, which the user may select to view an Element Performance Screen 500.

Figure 5:
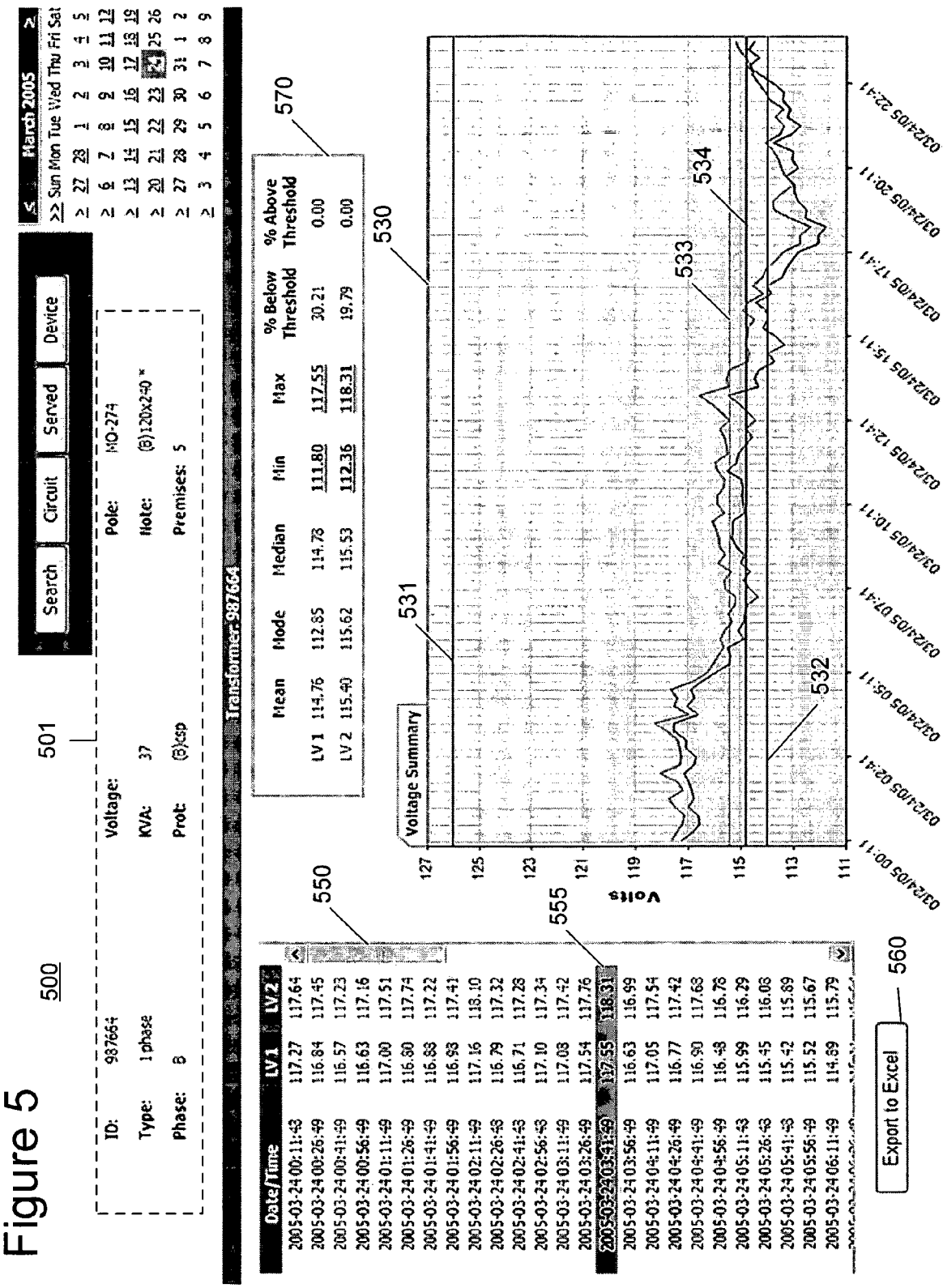
FIG. 5 is an illustration of an Element Performance Screen, in accordance with an example embodiment of the present invention.

As shown in FIG. 5, the Element Performance Screen 500 may include a header 501 and more detailed performance information of the EPDN element over a time period. This example of an Element Performance Screen 500 of a transformer includes a voltage plot 530 that graphically displays the voltage measured on each of the two LV energized conductors of the selected transformer over time. The voltage plot 530 may also display an upper limit 531 and a lower limit 532, which are 126V and 114V in the example voltage plot. By plotting the voltage over time and also displaying the limits, the user can quickly identify those times or time periods when the voltage on either energized conductor was above or below the respective threshold voltages. The voltage plot 530 may also display a median voltage (533 and 534) for each LV energized conductor of the selected distribution transformer for the time period.

The data used to calculate the median voltages and plot the voltages of the voltage plot 530 may be displayed in a voltage chart 550, which lists a date and time associated with the voltage measurements for the two LV energized conductors. The user may scroll up or down through the chart 550, which also hi-lights the highest and lowest voltage measurement of each LV energized conductor. The voltage chart 550 may display data for each measurement provided by the PLCS, every other measurement, every third measurement, or some other portion of the measurements provided as requested by the user. For example, if the user wanted to review the performance data (i.e., voltage measurements) of the transformer for a year, the chart 550 might show daily measurements, daily averages, or daily mean values. In contrast, if the user wanted to review the performance data (i.e., voltage measurements) of the transformer for a given day, the chart 550 might show measurements taken each fifteen minutes, thirty minutes, five minutes, or averages or mean values for such time periods. The user also may download the data in the voltage chart by clicking on the "Export" button, which will cause the data to be saved to a file on the local computer.

The transformer Element Performance Screen 500 may also include a summary chart 570, which may display the Mean, mode, median, minimum, and maximum voltages for each LV energized conductor over the time period. In addition, if the maximum or minimum voltage of either LV conductor is above or below the respective limit during the time period, the percentage above the upper limit and percentage below the lower limit may also be displayed. The user may select the minimum voltage or maximum voltage of either LV conductor by clicking on the value displayed in the summary chart 570, which will cause the voltage chart 550 to automatically scroll to a position to display the selected voltage (and date and time) in the voltage chart 550.

While viewing the transformer Element Performance Screen 500, the user may select the Served button, which may cause a new window (browser) to open (not shown) displaying information relating to the LV subnet of the transformer. Specifically, the LV subnet information may include the number of premises served, the addresses of the premises served, the customer names of the customer served, and the premise code of the premises served. In addition to the display of the above information in a grid, this data may be represented graphically with the serving transformer and meters represented by color coded indicia.

Figure 6:
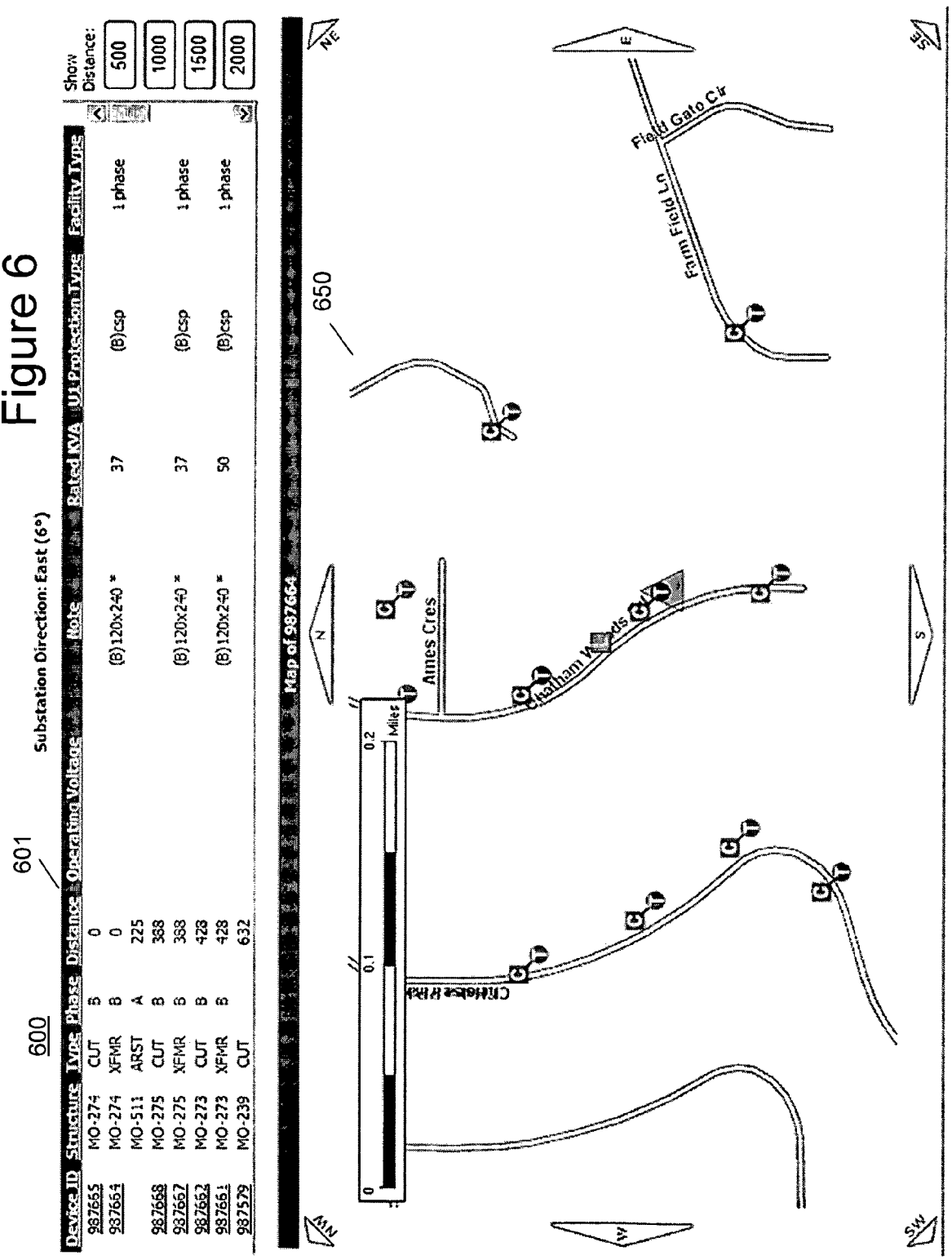
FIG. 6 is an illustration of a Device Screen according to an example embodiment of the present invention.

While viewing the transformer Element Performance Screen 500, the user may select the Device button, which may cause a new window (browser) to open displaying the Devices Screen 600. As shown in FIG. 6, the Devices Screen 600 may include a device list 601 and a device diagram 650. The device diagram may include indicia representing the various EPDN elements superimposed on a map and in relative positions to each other and the thoroughfares therein (as described above for the network circuit diagram 301). Again, the EPDN elements may be color coded as described above.

In the device diagram 650, the map (and view of the EPDN elements) is sized so that only indicia of EPDN elements within a selected (or predetermined) proximity of the selected transformer (or element) are displayed. In addition, the user may select any of the buttons labeled 500, 1000, 1500, or 2000 and the device diagram 650 may display (i.e., redisplay) re-sized so that only those elements within 500, 1000, 1500, or 2000 feet, respectively, of the selected transformer (or element) are displayed. Thus, when the 1000 feet button is selected, the example device diagram 650 of FIG. 6 depicts the elements (and map) that are within one thousand feet of the selected transformer.

As discussed, the Device Screen 600 includes a device list 601, which may include a list of devices that are present in the device diagram 650 and within the selected distance of the selected EPDN element. Thus, as the user selects different distances, the device list 601 will also change (increase or decrease) to shown only those EPDN elements with the selected distance. For each device, the device list 601 may also include the distance to the selected transformer (or element), a device ID, the phase to which the device is connected, the type of device, the structure ID to which the device is mounted, the operating voltage of the device (if appropriate), the rated voltage, the operating voltage of the device, any comments from the database (under "Note"), the type of protection (under "U1 Protection"), and the facility type (which may indicate the number of phases).

The user also may click on any element in the device diagram 650 and the Device Screen 600 will refresh to display the EPDN elements within the selected distance of the selected element. Similarly, the user also may click on any element in the device list 601 and the Device Screen 600 will refresh to display the EPDN elements within the selected distance of the selected element.

On all map pages a user can cause a high resolution satellite image to be superimposed over the map to allow for the determination of relative placement of elements. Additionally, such a representation of the actual structures being served allows for more succinct decision making by the user based on the type of structure (e.g., commercial or residential) and the relative size of the displayed structures.

Miscellaneous

Alternate embodiments of the present invention may include viewer or additional screens that present different information. For example, the network circuit diagrams and/or device diagrams of other embodiments may additionally depict the medium voltage power lines, the customer premises, the PLCS fiber optic backhaul links, and/or the low voltage power lines. In addition, the system may provide one or more links that opens one or more browsers or other windows that receive video data from a video camera, which may provide video data of a substation or other EPDN element. The camera may also be controlled to zoom in, zoom out, and pan in response to commands from the system.

Other EPDN performance data may also be presented to the user. For example, the customer premises may be represented by indicia on a diagram coded to indicate the power used by the premises. Additionally, the system may display the voltage data and indicia (indicating above, below, or within threshold voltages) of the customer premises, which data may be provided by a power usage meter. Also, power quality information may be presented to the user for each distribution transformer via coded indicia. Additionally, in response to a user input, the system may search and display information of the number of transformers in a given area with output voltages over the threshold voltage and under the threshold at any selected point in time or over any selected period of time. The system may also display information indicating power theft as well.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of presenting electric power distribution network (EPDN) performance data, wherein the EPDN includes a network circuit including a plurality of transformers, the method comprising:
   acquiring data derived from measurements of a performance parameter of a plurality of transformers;
   wherein the measurements comprise measurements of a parameter taken at each of the plurality of transformers;
   determining whether the data associated with each of the plurality of transformers satisfies any of three or more conditions for the performance parameter;
   displaying a network circuit diagram wherein the plurality of transformers are represented by a first indicia, wherein the relative positions of the first indicia substantially correspond to the positions of the transformers in the network circuit;
   displaying an indication of the performance parameter for each of the plurality of transformers; and
   wherein the indication of the performance parameter for each of the plurality of transformers indicates whether the data associated with each of the plurality of transformers satisfies any of three or more conditions for the performance parameter.

2. The method of claim 1, wherein said displaying an indication of the performance parameter comprises displaying the first indicia as color coded indicia to indicate whether the data associated with each of the plurality of transformers satisfies any of the three or more conditions for the performance parameter.

3. The method of claim 1, wherein the performance parameter is the voltage on at least one low voltage conductor connected to the transformer.

4. The method of claim 3, wherein the indicia is coded to indicate that the voltage is above a first threshold voltage, below a second threshold voltage, or between the first and second threshold voltages.

5. The method of claim 1, wherein the network circuit diagram further includes representation of thoroughfares and wherein the relative positions of the indicia in the display correspond to the positions of the transformers relative to the thoroughfares.

6. The method of claim 1, wherein the network circuit diagram illustrates at least a portion of one medium voltage network circuit.

7. The method of claim 1, wherein the EPDN includes at least one substation and substations are represented by a second indicia in the network circuit diagram, and the relative positions of the second indicia substantially correspond to the positions of the substations in the network circuit.

8. The method of claim 1, wherein the EPDN includes at least one switch bank and switch banks are represented by a second indicia in the network circuit diagram, and the relative positions of the second indicia substantially correspond to the positions of the switch banks in the network circuit.

9. The method of claim 8, wherein the EPDN includes at least one capacitor bank and capacitor banks are represented by a third indicia in the network circuit diagram, and the relative positions of the third indicia substantially correspond to the positions of the capacitor banks in the network circuit.

10. The method of claim 1, further comprising:
    receiving a user input indicating a selection of a transformer; and
    in response to the user input, displaying voltage data of the selected transformer.

11. The method of claim 10, wherein displaying voltage data comprises:
    formatting time-varying voltage data acquired over a predetermined period of time into a voltage plot; and
    displaying the voltage plot.

12. The method of claim 1, further comprising:
    receiving a user input indicating a selection of one of the plurality of transformers; and
    displaying an indication of an out of limit voltage of the selected transformer in response to receiving the user input.

13. The method of claim 1, further comprising:
    receiving a user input indicating a selection of a transformer; and
    displaying information of the addresses serviced by the selected transformer in response to the user input.

14. The method of claim 1, further comprising:
    receiving a user input indicating a selection of a transformer; and
    displaying information of the customers serviced by the selected transformer in response to the user input.

15. The method of claim 1, further comprising:
receiving a user input indicating a selection of a transformer in the network circuit diagram;
receiving a user input indicating a distance; and
displaying that portion of the network circuit diagram within the distance of the selected transformer indicated by the user in response to the user input.

16. The method of claim 1, wherein backhaul media is represented in the network circuit diagram.

17. The method of claim 1, wherein medium voltage power lines are represented in the network circuit diagram.

18. The method of claim 1, wherein the first indicia changes dynamically during display in accordance with changes in a value of the performance parameter.

19. A method of presenting EPDN data, wherein the EPDN includes a network circuit including a plurality of EPDN elements, the method comprising
acquiring EPDN data of a performance parameter for a plurality of EPDN elements;
wherein the acquired EPDN data is derived from measurement of the performance parameter at each of the plurality of EPDN elements;
determining whether the EPDN data associated with each of the plurality of EPDN elements satisfies any of three or more conditions for the performance parameter;
displaying indicia representing each of the plurality of EPDN elements on a diagram; and
wherein at least some of the indicia are coded to indicate whether the EPDN data of the EPDN element represented by the indicia satisfies any of the three or more conditions of the performance parameter.

20. The method of claim 19, wherein:
the EPDN elements include transformers;
the EPDN data includes voltage data of the transformers;
a first condition of the three or more conditions comprises the voltage data is above a first threshold voltage,
a second condition of the three or more conditions comprises the voltage data is below a second threshold voltage; and
a third condition of the three or more conditions the voltage data is between the first and second threshold voltages.

21. The method of claim 20, further comprising:
receiving a user input indicating a selection of a transformer; and
in response to said user input, displaying voltage data of the selected transformer.

22. The method of claim 21, wherein displaying voltage data comprises:
formatting time-varying voltage data acquired over a predetermined period of time into a voltage plot; and
displaying the voltage plot.

23. The method of claim 19, wherein the EPDN elements include switches, the method further comprising:
receiving configuration data of the switches that indicates an open or closed state; and
displaying an indication the configuration data on the diagram.

24. The method of claim 19, wherein the EPDN elements include capacitor banks, the method further comprising:
receiving configuration data of the capacitor banks that indicates an engaged or not engaged state; and
displaying an indication the configuration data on the diagram.

25. The method of claim 19, wherein the relative positions of the indicia substantially correspond to the positions of the EPDN elements in the portion of the EPDN depicted in the diagram.

26. The method of claim 19, further comprising:
receiving a user input indicating a selection of an EPDN element that comprises a transformer; and
displaying information of the addresses serviced by the selected transformer in response to the user input.

27. The method of claim 19, further comprising:
receiving a user input indicating a selection of an EPDN element that comprises a transformer; and
displaying information of the customers serviced by the selected transformer in response to the user input.

28. The method of claim 19, wherein at least some of the indicia changes dynamically during display in accordance with changes in the value of the performance parameter.

29. A method of presenting EPDN data, wherein the EPDN includes a network circuit including a plurality of EPDN elements, the method comprising:
acquiring EPDN data of a performance parameter for a plurality of EPDN elements;
wherein the acquired EPDN data is derived from measurement of the performance parameter at each of the plurality of EPDN elements;
determining whether the EPDN data associated with each of the plurality of EPDN elements satisfies any of three or more conditions for the performance parameter;
displaying a representation of a network circuit comprising:
representations of thoroughfares; and
indicia representing the plurality of EPDN elements;
wherein at least some of the indicia is coded to indicate whether the data of the EPDN element represented by the indicia satisfies any of three or more conditions of the performance parameter; and
wherein the positions of the indicia substantially correspond to the positions of the EPDN elements relative to the thoroughfares.

30. The method of claim 29, wherein:
the EPDN elements include transformers;
the EPDN data includes voltage data of the transformers;
a first condition of the three or more conditions comprises the voltage data is above a first threshold voltage,
a second condition of the three or more conditions comprises the voltage data is below a second threshold voltage; and
a third condition of the three or more conditions the voltage data is between the first and second threshold voltages.

31. The method of claim 29, further comprising:
receiving a user input indicating a selection of an EPDN element that comprises a transformer; and
displaying information of the addresses serviced by the selected transformer in response to the user input.

32. The method of claim 29, further comprising:
receiving a user input indicating a selection of an EPDN element that comprises a transformer; and
displaying information of the customers serviced by the selected transformer in response to the user input.

33. The method of claim 29, wherein at least some of the indicia changes dynamically during display in accordance with changes in the value of the performance parameter.

* * * * *